United States Patent [19]
Hatano et al.

[11] Patent Number: 5,436,043
[45] Date of Patent: Jul. 25, 1995

[54] FROSTED PLASTIC CONTAINER AND PROCESS FOR PRODUCING THE SAME

[75] Inventors: Yasushi Hatano; Yoshitsugu Maruhashi; Kouzaburo Sakano, all of Yokohama; Yuji Yamaguchi, Kawasaki; Toshiyuki Iwamoto, Yokohama, all of Japan

[73] Assignee: Toyo Seikan Kaisha, Ltd., Tokyo, Japan

[21] Appl. No.: 171,424

[22] Filed: Dec. 22, 1993

[30] Foreign Application Priority Data

Dec. 22, 1992 [JP] Japan .................................. 4-342875

[51] Int. Cl.$^6$ .............................................. B29D 23/00
[52] U.S. Cl. ................................ 428/35.7; 428/475.8; 428/327
[58] Field of Search ...................... 428/35.7, 475.8, 327

[56] References Cited

U.S. PATENT DOCUMENTS 5,230,934 7/1993 Sakano et al. ...................... 428/35.7

Primary Examiner—Charles R. Nold
Attorney, Agent, or Firm—Sughrue, Mion, Zinn, Macpeak & Seas

[57] ABSTRACT

A plastic container made of olefin resins having frosted appearance which gives excellent shade-off, deep and high-grade impression, and a process for producing the same. The process produces a plastic container having the above-mentioned appearance maintaining good reproducibility and excellent moldability. That is, a frosted plastic container wherein at least the outer surface of the plastic container is formed of a blend of plural kinds of olefin resins, one resin (A) forming the layer of said blend exists as a continuous phase, another resin (B) exists as a disperse phase, and the disperse phase which has an aspect ratio (ratio of long diameter/short diameter) of 6 or smaller and in which the grains exist having grain sizes (short diameters) of from 0.3 to 20 μm, has an area percentage of at least 15% or larger relative to the whole sectional area.

17 Claims, 6 Drawing Sheets

5,436,043

FROSTED PLASTIC CONTAINER AND PROCESS FOR PRODUCING THE SAME

BACKGROUND OF THE INVENTION (1) Field of the invention

The present invention relates to a plastic container having frosted appearance and to a process for producing the same. More specifically, the invention relates to a plastic container having frosted shade-off and high-grade appearance which is similar to that of a ground glass container, and to a process for producing the container maintaining good reproducibility.

(2) Description of the Prior Art

Plastic containers have now been widely used for packaging a variety of contents to substitute for glass containers, since they are light in weight and are excellent in shock resistance and other mechanical properties. Particularly, blow-molded containers made of olefin resins such as polyethylene, polypropylene and the like are much demanded since they are relatively cheap in cost and are easily molded.

Here, plastic containers having frosted appearance have been strongly demanded just like the ground glass containers have been widely used. The containers having frosted appearance give an impression of shade off, depth and high grade, and have been demanded particularly in the field of packaging containers for packaging cosmetics, toiletry goods and any other household products.

A technique which has heretofore been adopted to impart matted or frosted appearance to the plastic containers comprises sand-blasting the cavity surfaces of a metal mold that effects the blow-molding, and transferring the rugged pattern formed on the cavity surfaces onto the outer surfaces of the plastic container that is being molded.

In recent years, Japanese Laid-Open Patent Publication No. 86260/1992 is disclosing a plastic container having matted appearance in which at least the outer surface of the plastic container is formed of a blend of an ethylene-propylene block copolymer having an ethylene content of 3 to 10% by weight and a melt flow rate of from 0.8 to 10 g/10 min. and a high-density polyethylene. There is further disclosed that the inner surface of this multi-layer container is formed by an ethylene-propylene random copolymer having an ethylene content of 1 to 8% by weight and a melt flow rate of 1 to 5 g/10 min.

Among these prior techniques, the technique which sand-blasts the cavity surfaces of the metal mold has a defect in that frosted appearance is not reproduced to a satisfactory degree on the container that is molded. This defect is presumably related to a problem that the rugged pattern on the surface of the metal mold is not faithfully reproduced on the surface of the container when the plastic material that is under the molten state is cooled upon contact with the surface of the metal mold and to another problem that even when the rugged pattern on the surface of the metal mold is faithfully reproduced on the surface of the container, the frosted appearance does not develop to a satisfactory degree. In relation to these problems, it should be noted that the glass is completely amorphous while the plastic material is more or less crystalline and the glass is completely transparent while the plastic material has an internal haze.

According to the method of the above Japanese Laid-Open Patent Publication, considerably excellent frosted appearance is obtained as compared with those of when an ordinary olefin resin is used. Compared with the ground glass containers, however, the container is not yet satisfactory with respect to shade off, depth and high-grade appearance, leaving room for improvement.

SUMMARY OF THE INVENTION

The present inventors have forwarded the study in regard to optical properties on the outer surface of a container made of a blend of a plurality of olefin resins, and have discovered the fact that the frosted appearance on the outer surface of the container is greatly affected by the sizes and shapes of grains in the resin phase dispersed in the continuous phase and the fact that the melt tension and the shear viscosity of the two resins play important roles for forming a phase-separated structure excellent in frost appearance in the layer of the blend that is extruded.

That is, the object of the present invention is to provide a plastic container formed of olefin resins having frosted appearance which gives excellent shade-off, deep and high-grade impression, and a process for producing the same.

Another object of the present invention is to provide a process for producing a plastic container having the above-mentioned appearance maintaining good reproducibility and excellent moldability.

According to the present invention, there is provided a frosted plastic container wherein at least the outer surface of the plastic container is formed of a blend of plural kinds of olefin resins, one resin (A) forming the layer of said blend exists as a continuous phase, another resin (B) exists as a disperse phase, and the disperse phase which has an aspect ratio (ratio of long diameter/short diameter) of 6 or smaller and in which the grains exist having grain sizes (short diameters) of from 0.3 to 20 μm, has an area percentage of at least 15% or larger relative to the whole sectional area.

According to the present invention, furthermore, there is provided a process for producing a frosted plastic container comprising melt-extruding a blend as at least the outer surface of a parison and hollow-molding the thus extruded parison, said blend being comprised of an olefin resin (A) that forms a continuous phase and an olefin resin (B) of a different kind that forms a disperse phase at a volume ratio of 90:10 to 55:45, the resin (B) that forms the disperse phase in the blend having a melt tension greater than that of the resin (A) that forms the continuous phase, and a difference in logarithmic value between the shear viscosities (poises) of these resins at an extrusion temperature being 1 or smaller as an absolute value at a shear rate over a range of from 10 to $10^3$ sec$^{-1}$.

DETAILED DESCRIPTION OF THE INVENTION

According to the present invention, it is desired that the container has a haze ($H_1$) which is 65% or smaller as measured by applying a liquid paraffin to both surfaces of the container and has a haze (H) of 45% or greater as found from the following relation by using the above haze $H_1$ and a haze ($H_0$) that is measured by applying the liquid paraffin to the inner surface of the container, $$H=(H_0-H_1)/(1-H_1/100) \text{ [unit in \%]}$$

According to the present invention, it is basically important that at least the outer surface of the plastic container is formed of a blend of plural kinds of olefin resins, and that one resin (A) forming the blend layer exists as a continuous phase and the other resin (B) exists as a disperse phase from the standpoint of producing frosted appearance. It was also found that the frosted appearance is seriously affected by the shapes and sizes of the resin grains that exist in the disperse phase. That is, it was found that the frosted appearance is effectively produced when the dispersed grain phase has a round shape rather than flat and when the grain sizes lie within a predetermined range.

Figure 1:
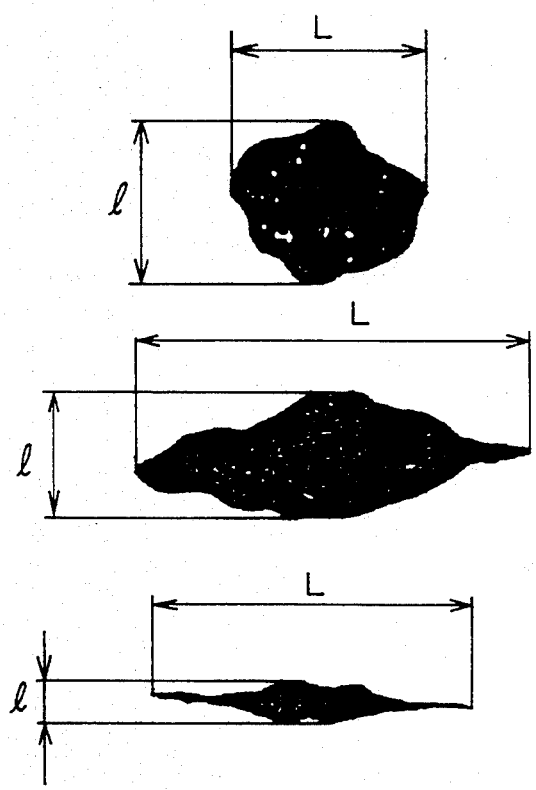
FIG. 1 is a diagram explaining some examples for finding a long diameter (L) and a short diameter (l) of a disperse phase in the blend layer.

The shapes and sizes of grains in the disperse phase in the blend layer can be evaluated by measuring the aspect ratios and grain sizes using a microphotograph of the sectional surface of the phase of the blend. FIG. 1 illustrates some examples of finding a long diameter (L) and a short diameter (l) of the disperse phase.

Satisfactory frosted appearance that gives high-grade impression of shade off and depth is obtained when the disperse phase in which the aspect ratio (ratio of long diameter/short diameter) is 6 or smaller and, particularly, 3 or smaller and the grains have a size (short diameter) of from 0.3 to 20 μm and, particularly, from 0.5 to 10 μm, has the area percentage of 15% or larger and, particularly, has the area percentage of 20 to 60% relative to the whole sectional area.

The appearance appeals to human visual senses and must eventually be evaluated by human eyes. As objective and scientific standards of evaluation, however, 60° gloss must have a relatively small value and, besides, the following considerations have important meanings.

The frosted container often requires high light transmission property such that the color of a colored content can be seen through or that the remaining amount of the content can be recognized. In such a case, it is desired that the material itself of the frosted container has a very high light transmission factor like the ground glass and, at the same time, exhibits a high surface haze. To apply them to the plastic container, it becomes important to use a resin having a high light transmission factor on the inside of the container to decrease the internal haze of the material and, at the same time, to maximize the light scattering property on the outer surface of the container. That is, it becomes important to decrease the internal haze ($H_1$), which is measured under the condition where the effect of scattered light is minimized on the inner surface and outer surface of the container by applying liquid paraffin to both surfaces of the container, and to increase the haze (H) that stems from the ruggedness on the outer surface. The haze H on the outer surface cannot be directly found, but is approximately defined by a relation (1) by using the internal haze $H_1$ and the haze ($H_0$) that is measured by applying liquid paraffin to the inner surface only of the container. According to the present invention, it is desired that the haze $H_1$ is 65% or smaller and the haze H on the outer surface found according to the relation (1) is 45% or larger.

$$H=(H_0-H_1)/(1-H_1/100) \tag{1}$$

Reference should be made to Examples and, particularly, to Table 1 and FIG. 2 appearing later.

Figure 2A:
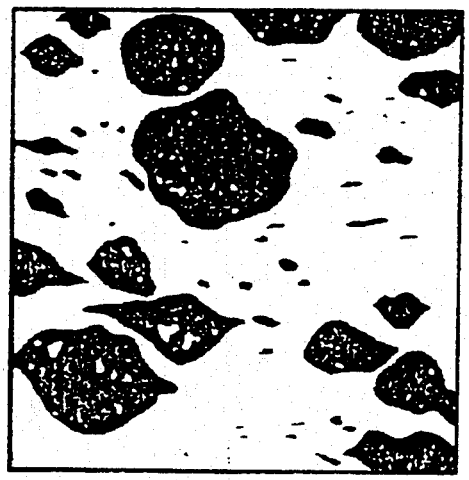
FIG. 2 is a diagram explaining the states of the continuous phase and the dispersed granule phase in Examples and Comparative Examples.
Figure 2B:
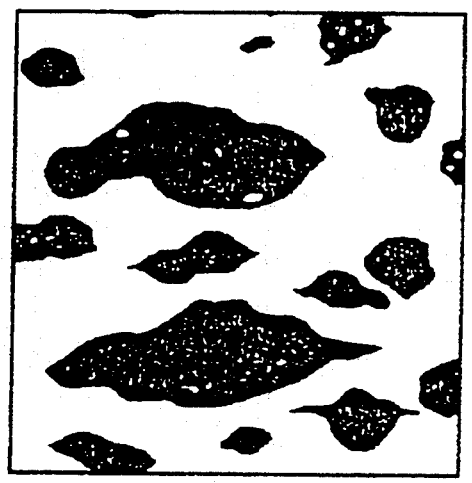
Figure 2C:
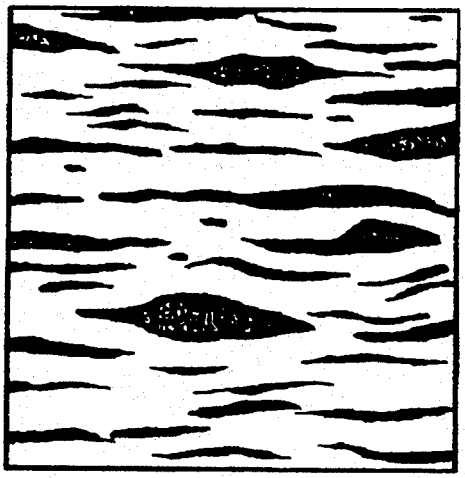

That is, the haze H on the outer surface is smaller than 45% and the frost impression is insufficient by visual evaluation when the continuous phase and the dispersed grain phase are not distinctly established (Comparative Example 2, FIG. 2d) or when the disperse phase in which the aspect ratio is 6 or smaller and the grain size is from 0.3 to 20 μm has the area percentage of smaller than 15% relative to the whole sectional area even when the disperse phase is distinctly established (Comparative Example 1, FIG. 2c). It will be understood from the above fact that the haze H of greater than 45% is accomplished on the outer surface, and the frosted appearance is produced and, particularly, high-grade shade-off and deep impression is produced when the disperse phase is distinctly established having an aspect ratio of 6 or smaller, containing grains of sizes of from 0.3 to 20 μm, and having an area percentage of 15% or larger relative to the whole sectional area.

According to the present invention, it is important that the grains in the disperse phase have a grain size distribution that lies within a predetermined range. When the amount of fine grains becomes too great, the frosted impression disappears from the surface. When the amount of coarse grains becomes too great, on the other hand, the surface exhibits coarse impression and loses fine shade-off impression.

The plastic container of the present invention is produced by melt-extruding a blend of plural kinds of olefin resins as at least the outer surface of a parison, and hollow-molding the extruded parison. In order to obtain the phase-separated structure, it is important that the resin (B) that forms the disperse phase in the blend has a melt tension higher than that of the resin (A) that forms the continuous phase, and that a difference in logarithmic value between the shear viscosities (poises) of these resins at an extrusion temperature is 1 or smaller as an absolute value at a shear rate over a range of from 10 to $10^3$ sec$^{-1}$.

When the molten blend of the plural kinds of resins is composed of the resin (A) that forms the continuous phase and the resin (B) that forms the disperse phase having the above-mentioned melt tensions and shear viscosities, the aforementioned phase-separated structure is easily formed and very effective frosted impression is obtained.

Reference should be made again to Examples described later.

That is, when the melt tension of the resin (A) that forms the continuous phase is greater than the melt tension of the resin (B) that forms the disperse phase, phase-separated structure specified by the present invention is not formed as described in Comparative Examples 1 and 2, and the frosted appearance is not produced. When the melt tension of the resin (B) that forms the disperse phase is greater than the melt tension of the resin (A) that forms the continuous phase, on the other hand, the disperse phase acquires a small aspect ratio and, besides, the grain size can be controlled to lie within a predetermined range, making it possible to effectively develop the frosted appearance.

Figure 3:
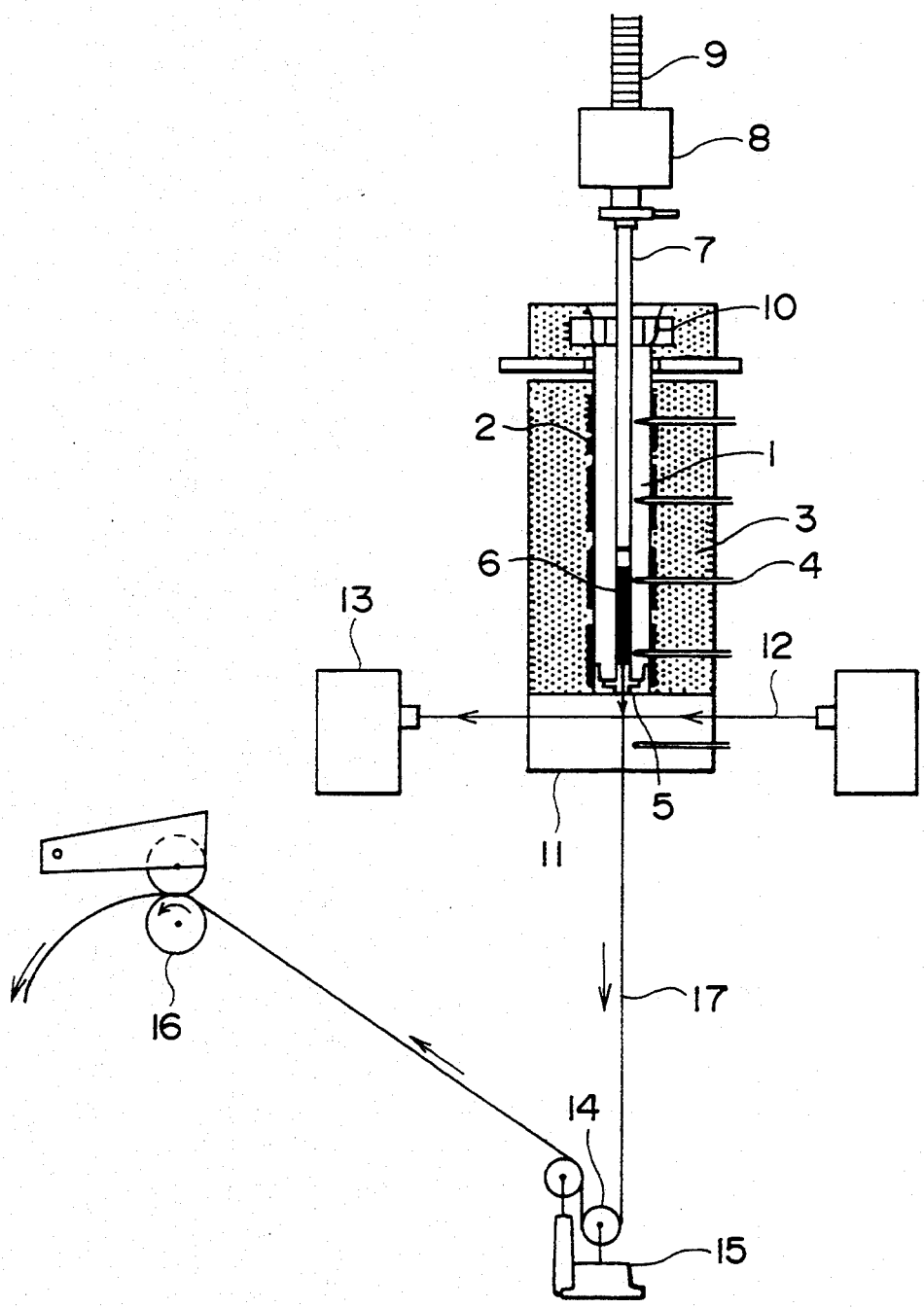
FIG. 3 is a diagram illustrating the principle for measuring the shear viscosity and the melt tension.

Melt tension stands for a force with which a molten resin is allowed to maintain its surface areas small repelling the force of working, and can be found by measuring the tensile force of the molten resin that is extruded under predetermined conditions while setting the rate of deformation constant. FIG. 3 is a diagram explaining the principle of measurement, wherein a barrel 1 is provided with a heater 2 on the surface thereof, which is then surrounded by a heat-insulating material 3 for retaining the heat. The barrel 1 is provided with heat-sensing members 4 for measuring the temperature at several places. At the lower end of the barrel 1 is provided a capillary 5 for extruding the resin. Inside the barrel is contained a sample, i.e., a molten resin 6.

A piston 7 is inserted in the barrel via an automatic centering device 10 in order to apply the load of extrusion to the molten resin 6. The piston 7 is connected to a load cell 8 and to a screw 9 for limiting the load of extrusion. The lower periphery of the capillary 5 is surrounded by a heat-retaining chamber 11, and just under the capillary 5 is provided a detector 13 which detects die swell using a laser beam 12. Further under the capillary 5 is provided a tension cell 15 equipped with a tension pulley 14, and by the side thereof is disposed a take-off roll 16. A molten resin filament 17 extruded from the capillary 5 is drawn by the take-off roll 16 via the tension pulley 14. At this moment, the tension, i.e., melt tension is measured by the tension cell 15.

Figure 4:
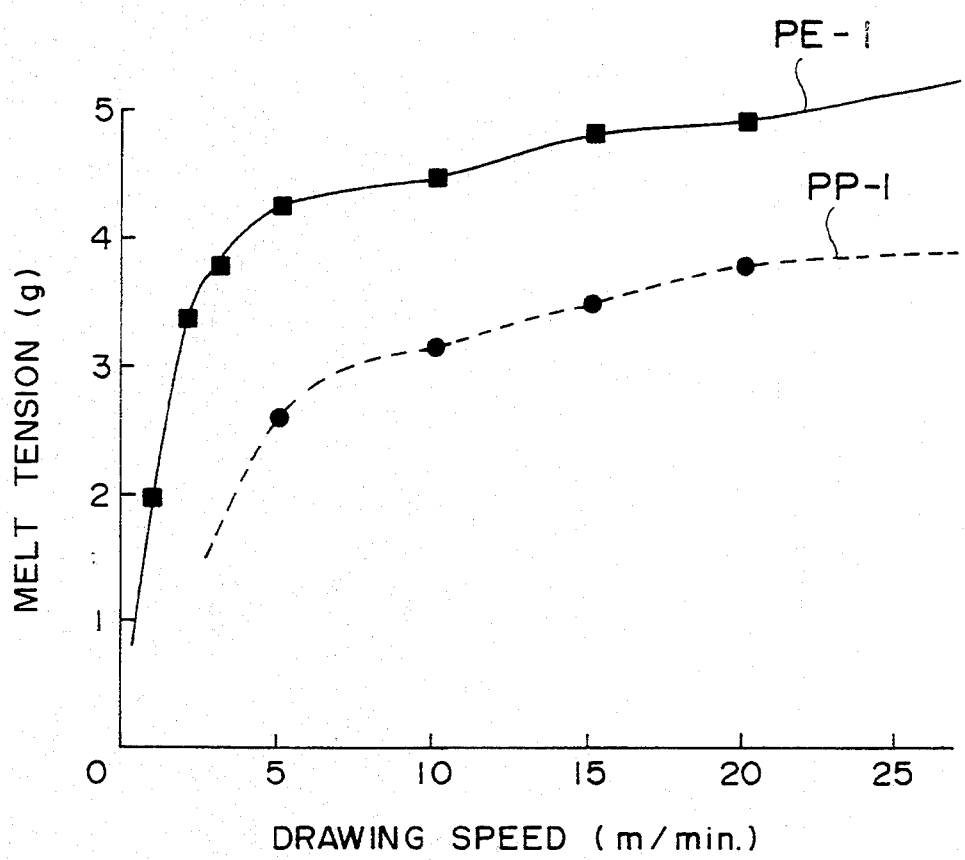
FIG. 4 is a diagram illustrating a relationship between the take-off speed and the melt tension in some examples of resins.

FIG. 4 is a diagram illustrating a relationship between the take-off speed and the melt tension concerning several examples of resins, from which it will be learned that the melt tension becomes nearly constant when the take-off speed is greater than 10 m/sec. It will be learned from FIG. 4 that a resin PP-1 forming the continuous phase of Example 1 appearing later has a low melt tension whereas a resin PE-1 forming the disperse phase has a considerably high melt tension.

According to the present invention in which the dispersed resin has a melt tension which is considerably greater than that of a melt tension of the continuous matrix resin as described above, the disperse phase resin tends to become round conspicuously in the layer of the blend making it possible to obtain excellent frosted appearance.

Figure 5:
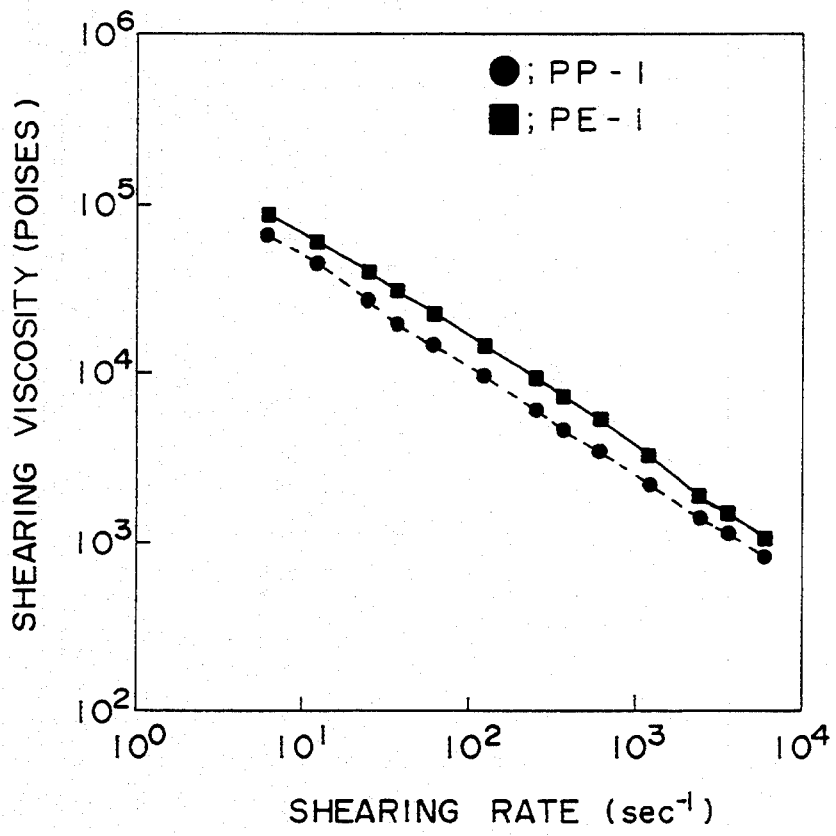
FIG. 5 is a graph illustrating a relationship between the shear rate and the shear viscosity in some examples of resins.

Shear viscosities of the resins at an extrusion temperature are found from the shear stress ($\tau$) of the formula 1 and the shear rate ($\gamma$) of the formula 2 in compliance with the formula 3 which are appearing later by using the device shown in FIG. 3. FIG. 5 is a graph showing a relationship between the shear rate and the shear viscosity of some resins, and in which are plotted the resin PP-1 forming the continuous phase and the resin PE-1 forming the disperse phase of Example 1 described later.

When a difference in logarithmic value between the shear viscosities of the continuous phase resin (A) and the disperse phase resin (B) exceeds 1 as an absolute value at a shear rate over a range of from 10 to $10^3 sec^{-1}$, the dispersed grains become coarse and favorably phase-separated structure is not obtained. When the difference is smaller than 1 as an absolute value, however, there is obtained a relatively uniform dispersion in which the grains have sizes of from 0.3 to 20 $\mu$m.

According to the present invention as described above, the blend consisting of a combination of the continuous phase resin and the disperse phase resin is blow-molded as an outer layer in order to produce a plastic container composed of olefin resins exhibiting frosted appearance and excellent shade-off, deep and high-grade impression.

CONTAINER

Figure 6:
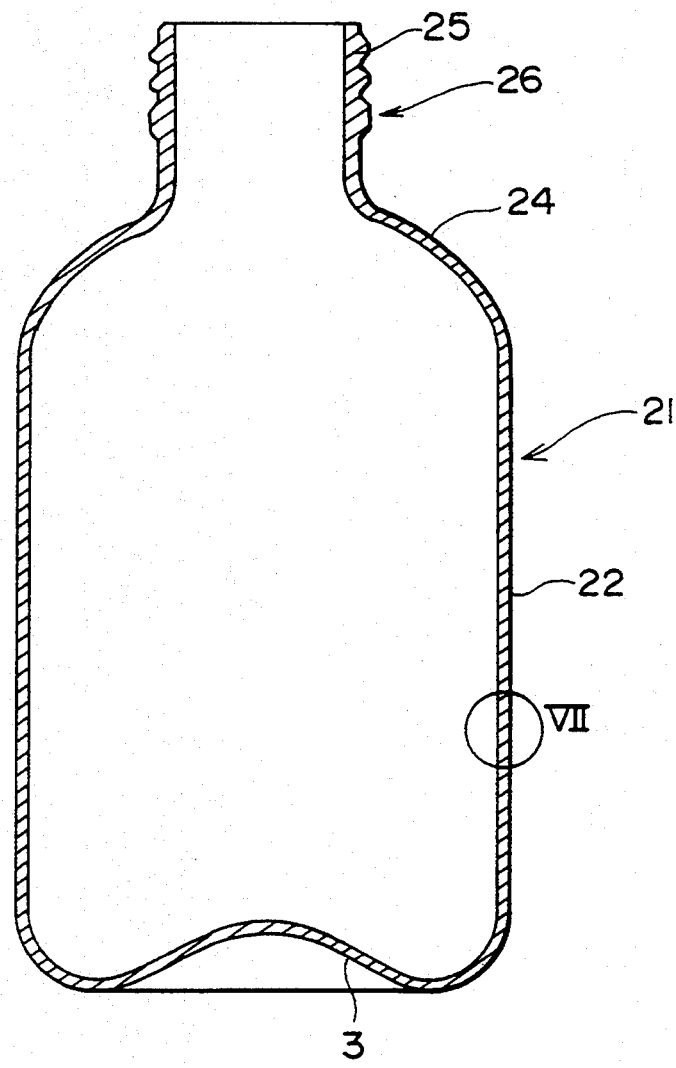
FIG. 6 is a side sectional view of a plastic container according to the present invention.
Figure 7:
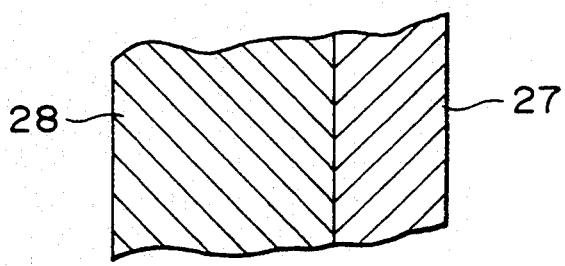
FIG. 7 is a sectional view showing the cross section of the container of FIG. 6.

Referring to FIG. 6 which illustrates a plastic container of the present invention, a container 2i comprises a bottom 23 which is continuous to the lower end of a barrel 22 and is usually formed by pinching off the container material (parison), and a closure-mounting portion 26 which is continuous to the upper end of the barrel 22 via a shoulder 24 and includes a mouth 25 with which a closure (not shown) will engage hermetically. Referring to FIG. 7 which is a sectional view, the container comprises an outer layer 27 of the blend constituting the frosted outer surface and a base member or an inner layer 28. According to the container of the present invention, it is essential that a particular blend phase is provided on the outer layer only. The container may be comprised of the blend layer only or may have two or three or more resin layers formed on the inside of the outer layer.

BLEND LAYER

The blend layer for forming the outer layer is comprised of a combination of resins that satisfy the aforementioned requirements among the olefin resins. Examples of the olefin resin include homopolymers and copolymers of olefins such as ethylene, propylene, butene-1, pentene-1, hexene-1, octene-1, and the like.

In the blend, the resin (A) forming the continuous phase should exist in an amount larger than that of the resin (B) forming the disperse phase. Generally, it is desired that A:B=90:10 to 55:45 and, particularly, 85:15 to 60:40 in terms of a volume ratio. From the standpoint of developing frosted appearance, furthermore, it is desired that the resin (A) forming the continuous phase has a melting point or a softening point which is higher than that of the resin (B) forming the disperse phase.

It is further desired that the resin (A) forming the continuous phase and the resin (B) forming the disperse phase are olefin resins of which the chief constituent olefin units are different from each other. It is particularly desired that the resin (A) forming the continuous phase be a propylene-type resin and the resin (B) forming the disperse phase be an ethylene-type resin.

As the propylene-type resin, there can be used a homopolymer of propylene or a random or a block copolymer of a propylene with other olefins such as ethylene, butene-1, 2-methylpentene-1 and the like. The propylene-type polymer can be used in a single kind or in a combination of two or more kinds. It is desired that the propylene-type polymer contains propylene in an amount of 90% by weight or more.

As the propylene-type polymer, an ethylene-propylene block copolymer is particularly preferred usually comprising a homopropylene polymer block and an ethylene-containing polymer block coupled thereto. The ethylene-containing polymer block may comprise either a homopolyethylene block of ethylene alone or a random copolymer block of ethylene and propylene consisting chiefly of ethylene. In effect, the ethylene-containing block should contain ethylene in an amount of 3 to 10% by weight.

As the ethylene-type polymer, on the other hand, there can be used a low-density, a medium-density or a high-density polyethylene, or a linear low-density or medium-density polyethylene which is a copolymer of ethylene and small amounts of other α-olefin, or a copolymer of ethylene and other monomer such as vinyl or acrylic monomer, e.g., ionomer, EVA, EEA or the like. The ethylene-type polymer can be used in a single kind or in a combination of two or more kinds. It is desired that the ethylene-type polymer contains ethylene in an amount of 80% by weight or more.

The olefin polymer exhibits a melt tension which radically differs depending upon the kind of the resin. When, for instance, the propylene-type resin is compared with the ethylene-type resin, the ethylene-type resin exhibits a melt tension which is relatively higher than that of the propylene-type resin. When the main monomers are the same, on the other hand, the melt tension tends to increase with a decrease in the melt flow rate. From such a point of view, though the measuring temperatures are 230° C. and 190° C. which are not the same, it is desired that the propylene-type resin has a melt flow rate (MFR) of 1 to 10 g/10 min. and the ethylene-type resin has a melt flow rate (MFR) smaller than that of the propylene-type resin. Concretely speaking, when the propylene-type resin has an MFR of 1 g/10 min., the ethylene-type resin should have an MFR which is smaller than 1 g/10 min. and when the propylene-type resin has an MFR of 10 g/10 min., the ethylene-type resin should have an MFR which is 3 g/10 min. or smaller.

The blend may further be blended with any blending agents that have been known per se. Such as a lubricant, an antioxidant, an ultraviolet ray-absorbing agent, a coloring agent (dyestuff), a stabilizer and the like according to a recipe that has been known per se.

MULTI-LAYER STRUCTURE

In the present invention, it is desired that the container is a multi-layer container having two layers, three layers or more layers. This container comprises an outer layer composed of the above-mentioned blend and an inner layer composed of other olefin resin having excellent transparency. It is desired that the other olefin resin is a propylene-type resin from the standpoint of transparency and is, particularly, an ethylene-propylene random copolymer.

According to another example, the container of the multi-layer structure comprises an outer layer composed of the blend, the inner layer composed of other olefin resin, and an intermediate layer of a gas-barrier resin interposed between the above two layers. Adhesive layers are usually interposed among the intermediate layer, outer layer and inner layer. It is desired that the olefin resin forming the inner layer is a propylene-type resin and, particularly, the above-mentioned ethylene-propylene random copolymer.

In this embodiment, the gas-barrier resin usually should have an oxygen permeability coefficient ($PO_2$) of $5.5 \times 10^{-12}$ cc.cm/cm$^2$.sec.cmHg or smaller and, particularly, $4.5 \times 10^{-12}$ cc.cm/cm$^2$.sec.cmHg or smaller yet having the above-mentioned transparency. Particularly, there will be preferably used an ethylene-vinyl alcohol copolymer having an ethylene content of 20 to 50 mol % and a content of unsaponified vinyl ester residue of 5 mol % or smaller, or a homopolyamide or a copolyamide having amide groups in a number of 3 to 30 and, particularly, in a number of 4 to 25 per 100 carbon atoms, or a blend thereof. As a polyamide, in particular, there will be used a polycondensation product of fatty acid and aromatic diamines, such as a polycondensation product of metaxylylene diamine and adipic acid. It is, of course, allowable to use the above-mentioned ethylene-vinyl alcohol copolymer and polyamide in the form of a blend which may further be blended with other thermoplastic resin such as polyolefin or a resin that imparts adhesiveness relative to the polyolefin, in an amount that does not impair the properties thereof, for example, in an amount of 20% by weight or smaller.

When there is no adhesiveness among the gas-barrier resin, the inner layer and the outer layer, it is desired to interpose among these resin layers an adhesive layer such as of an acid-modified olefin resin like polyethylene or polypropylene which is graft-modified with an ethylenically unsaturated carboxylic acid such as maleic anhydride, acrylic acid, methacrylic acid or itaconic anhydride, or an anhydride thereof. Instead of interposing the adhesive layers, the above-mentioned resin may be contained at least in the gas-barrier layer or in the inner surface layer and in the outer surface layer.

In the container of the present invention, the above-mentioned blend layer should occupy at least 3% and, preferably 5 to 95% of the whole thickness of the container.

MOLDING THE CONTAINER

The container is obtained by melt-extruding a single layer of the blend or a laminated layer of the blend and other resin layer into the form of a parison, and blow-molding the parison in the split mold. The split mold may have a mirror-finished cavity. It is, however, desired to use a sand-blasted cavity from the standpoint of obtaining frosted appearance, extracting the air, and preventing the melt-adhesion between the resin and the surface of the metal mold.

The melt should be extrusion-molded into a preform under the condition where the resin (B) forming the disperse phase in the blend has a melt tension higher than that of the resin (A) forming the continuous phase, and a difference in logarithmic value between the shear viscosities (poises) of the resins is 1 or smaller as an absolute value at a shear rate over a range of from 10 to $10^3$ sec$^{-1}$.

Though it may vary depending upon the resin constitution, the temperature for extruding the melt should generally be from 180° to 220° C. when the resin chiefly comprises a polypropylene as will be described later in Example 1. The parison is pinched off in the split mold and a fluid is blown into the interior thereof to inflate it. The compressed air is generally used as the fluid. As desired, however, an inert gas such as nitrogen can be used.

The invention will now be described by way of Examples.

EXAMPLES

Examples and Comparative Examples

As the resin for forming the inner layer of the container, there was prepared a propylene-ethylene random copolymer having a melt flow rate of 1.5 g/10 min. (230° C.) and an ethylene content of 5% by weight. As the resins for forming the outer layer of the container, furthermore, there were prepared:

polypropylene-type resins;
- PP-1; a propylene-ethylene block copolymer having a melt flow rate of 2.0 g/10 min. (230° C.) and an ethylene content of 4% by weight,
- PP-2; an isotactic polypropylene having a melt flow rate of 2.5 g/10 min. (230° C.), polyethylene-type resins;
- PE-1; a high-density polyethylene having a melt flow rate of 0.35 g/10 min. (190° C.),
- PE-2; a high-density polyethylene having a melt flow rate of 5.3 g/10 min (190° C.), having a difference in logarithmic value between the shear viscosities thereof of 1 or smaller as an absolute value at a molding temperature (in this case, at a resin extrusion temperature of 200° C.) and at a shear rate over a range of from 10 to $10^3$ sec$^{-1}$, as well as, as a reforming agent, an ethylene-α-olefin copolymer having a melt flow rate of from 4.5 g/10 min. (190° C.) to 8.1 g/10 min. (230° C.).

The resins that form the continuous phase and the resins that form the disperse phase were so combined that their melt tensions at the molding temperature established the following relations:

Resins that form the continuous phase < resins that form the disperse phase (Examples 1 and 2), Resins that form the continuous phase > resins that form the disperse phase (Comparative Examples 1 and 2), and were dry-blended at blending ratios (weight ratio) shown in Table 1.

The resin for forming the inner layer of the container and the dry-blended resins for forming the outer layer of the container were fed to an extruder and were extruded into a parison of two layers at an extruding temperature of 200° C. Then, by using a metal mold having sand-blasted surfaces, the parison was blow-molded to prepare a bottle.

The obtained bottles possessed side walls of a whole thickness of about 1 mm though it varied depending upon the individual bottles or the place of measurement. By using a microtome, furthermore, a thin section was cut out. When measured by using a microscope, the ratio of thickness of the outer layer:the inner layer was about 1:18.

Figure 2D:

The frost impression of the bottle, haze, 60° gloss on the outer surface of the bottle, average aspect ratio (ratio of long diameter/short diameter) of the dispersion layer in the outer layer of the bottle, and area percentage of the disperse phase relative to the whole sectional area, were evaluated. The results were as shown in Table 2. As for the aspect ratio of particles in the blend layer, the cross section which is in parallel with the circumferential direction of the bottle exhibited an aspect ratio greater than an aspect ratio exhibited by the cross section which is in parallel with the direction of height of the bottle. Therefore, Table 2 shows the aspect ratios of the cross section which is in parallel with the circumferential direction of the bottole. FIGS. 2a, 2b, 2c and 2d show the observed results of the cross sections which are in parallel with the circumferential direction. As shown in FIGS. 2c and 2d, the phase-separated structure was in a laminar form in Comparative Example 1, and the phase-separated structure in Comparative Example 2 was not of the dispersed grain phase structure.

From the results of evaluation of frosted impression, haze and 60° gloss, the bottles of Examples 1 and 2 exhibit excellent frosted appearance. The reason why such excellent frosted appearance is obtained is attributed to that the shape of grains dispersed in the blend layer is reflected as ruggedness on the outer surface of the container. That is, in the bottles of Examples 1 and 2, the dispersed phase in the blend layer has an aspect ratio (ratio of long diameter/short diameter) of 6 or smaller, contains grains having grain sizes (short diameter) of from 0.3 to 20 μm, and yet has an area percentage of 15% or larger with respect to the whole sectional area. This can be proved from that the ruggedness on the outer surface of the container is of the same level as size of the disperse phase, which is considerably finer than she ruggedness on the surface of the metal mold that is blasted with sand. It is, on the other hand, considered that the ruggedness on the surface of the metal mold contributes to forming the frosted surface by preventing the resin from intimately adhering to the metal mold.

The phase-separated structure exhibited by the bottles of Examples 1 and 2 is realized by the combination of resins which have a difference in logarithmic value between the shear viscosities (poises) thereof of 1 or smaller as an absolute value at an extrusion temperature and at a shear rate over a range of from 10 to $10^3$ sec$^{-1}$, and in which the resin forming the dispersed phase has a melt tension higher than that of the resin forming the continuous phase.

According to the present invention as described above, there is obtained a plastic container having excellently frosted appearance. It should be noted that the present invention can be adapted not only to the containers mentioned in Examples but also to other various containers such as colored bottles, multi-layer bottles that require gas-barrier property and the like bottles.

Mentioned below are the methods of evaluation employed in Examples and Comparative Examples.

METHOD OF EVALUATING FROSTED APPEARANCE

The bottle was filled with water up to 80% of its volume, and the frosted appearance was qualitatively evaluated using the light of a fluorescent lamp.

METHOD OF EVALUATING HAZE

A test piece measuring 50×50 mm was cut out from the side wall of the bottle, and liquid paraffin was applied to the surface of the test piece that was the inner surface of the bottle to measure the haze. The liquid paraffin was uniformly applied over a range of a diameter of about 20 mm with a portion where the incident light falls as a center. The liquid paraffin was further applied even onto the surface of the test piece that was the outer surface of the bottle to measure the haze. The measurement was taken by using a hazeometer manufactured by Suga Shikenki Co. Since the test piece had been curved, the measurement was taken by holding the test piece flat by using a jig.

MEASURE OF MEASURING 60° GLOSS

A test piece measuring 50×50 mm was cut out from the side wall of the bottle, and the surface of the test piece that was the outer surface of the bottle was measured for its 60° gloss. The measurement was taken by using a glossmeter manufactured by Suga Shikenki Co. Since the test piece had been curved, the measurement was taken by holding the test piece fiat by using a jig.

METHOD OF MEASURING ASPECT RATIO OF DISPERSE PHASE, GRAIN SIZE AND AREA PERCENTAGE RELATIVE TO THE WHOLE SECTIONAL AREA

A test piece cut from the side wall of the bottle in parallel with the circumferential direction or in parallel with the direction of height of the bottle was sen to an ultra-microtome and from which a ultra-thin section was cut out by the cryo-sectioning technique. The section was exposed to the vapor of ruthenium tetroxide to dye it. Then, the phase-separated structure of the resign in the outer layer of the container was photographed using a transmission-type electron microscope. The particle size (short diameter) and the aspect ratio (ratio of long diameter/short diameter) of the disperse phase were found by multiplying a value measured from the printing paper by the magnification of picture-taking and the magnification of printing on the printing paper. The area percentage of the disperse phase which has the aspect ratio (ratio of long diameter/short diameter) of 6 or smaller and in which the grains exist having grain sizes (short diameters) of from 0.3 to 20 μm, was found with respect to the whole sectional area relying upon the image processing using a computer.

METHOD OF MEASURING SHEAR VISCOSITY AND MELT TENSION

The shear viscosity of the resin at a parison extrusion temperature was measured at a shear rate of from 10 to $10^3$ sec$^{-1}$ by using a Capillograph 1B produced by Toyo Seiki Mfg. Co. FIG. 3 shows the measuring method. The shear viscosity was calculated in compliance with the following equations.

where P is an internal pressure of the barrel, F is a load of extrusion, R is a radius of the barrel (4.775 mm), r is a radius of the capillary (0.5 mm), L is a length of the capillary (10 mm), Q is a flow rate, V is an amount of extrusion, and t is a time.

Similarly, the mein tension of the molten resin extruded from the capillary was measured by using the Capillograph 1B produced by Toyo Seiki Mfg. Co. The measuring method was as shown in FIG. 3. Here, the capillary was the same as that of when the shear viscosity was measured, and the distance was set to be 40 cm from the outlet of the capillary to the center of the pulley for measuring the tension. The extrusion rate (moving speed of the piston) was 10 mm/min., and the take-off speed of the resin was from 10 m/min. to 20 m/min. The atmospheric temperature during the measurement was 23°±2° C.

When plural kinds of resins are used for forming the continuous phase or the dispersed phase like in Example 2 where a reforming agent is used as part of the resins for forming the disperse phase, the resins that form the continuous phase or the disperse phase are melt-blended at their feeding ratios and from which the measurement is taken. However, when the chief component of the resin is forming the continuous phase but part thereof is a component of the disperse phase like in the block copolymer used in Example 1, the resin forming the continous phase only needs be measured. This is because, even this method helps accomplish the object intended by the present invention as in Example 1. When the individual resins forming the disperse phase are dispersing independently from each other, the individual resins have to be measured.

TABLE 1

| | Continuous phase | Disperse phase | Blending ratio (weight ratio) |
|---|---|---|---|
| Example 1 | PP-1 | PE-1 | 80:20:0 |
| Example 2 | PP-2 | PE-1 reforming agent | 78:18:4 |
| Comparative Example 1 | PP-1 | PE-2 | 80:20:0 |
| Comparative Example 2 | PE-1 | PP-1 | 80:20:0 |

TABLE 2

| | Melt tension[1] | | Frosted appearance | Measured and calculated values of haze | | | 60° glass | Average aspect ratio of dispersion phase (long diameter/short diameter) | Area percentage of dispersion phase[2] |
|---|---|---|---|---|---|---|---|---|---|
| | Resin forming continuous phase | Resin forming dispersion phase | | $H^1$ | $H^0$ | H | | | |
| Example 1 | 3 g | < 5 g | good | 57% | 79% | 51% | 5.6% | 1.6 | 41% |
| Example 2 | 2 g | < 4 g | good | 58% | 78% | 48% | 6.0% | 2.2 | 38% |
| Comparative Example 1 | 3 g | > 2 g | poor | 43% | 67% | 42% | 7.1% | 8 or more | 1% or less |
| Comparative Example 2 | 5 g | > 3 g | poor | 45% | 69% | 44% | 6.9% | (non-granular dispersion) | — |

[1]Melt tension was measured by setting the resin-drawing speed to be 15 m/min.
[2]Area percentage of the dispersion phase is that of the dispersion phase having an aspect ration (ratio of long diameter/short diameter) of 6 or smaller and in which grains have sizes (short diameters) of 0.3 to 20 μm, relative to the whole sectional area.

$$\text{Shear stress } \tau = \frac{Pr}{2L} = \frac{Fr}{2\pi R^2 L} \quad (1)$$

$$\text{Shear rate } \gamma = \frac{4Q}{\pi r^3} = \frac{4V}{\pi r^3 t} \quad (2)$$

$$\text{Shear viscosity } \eta = \tau/\gamma \quad (3)$$

According to the present invention in which a particular continuous phase resin and a particular disperse phase resin are combined together and are blow-molded as a blend to form an outer layer, it is allowed Lo produce a plastic container of olefin resins having frosted appearance which is excellent in shade-off, depth and high-grade impression.

The present invention which uses a particular blend gives an advantage in that a container having frosted appearance can be produced maintaining good reproducibility and good productivity at all times.

We claim:

1. A frosted plastic container wherein at least the outer surface of the plastic container is formed of a blend of olefin resins comprising a continuous phase of a resin (A), and a disperse phase of a resin (B), the disperse phase having an aspect ratio (ratio of long diameter/short diameter) of 6 or smaller and containing grains of resin B having grain sizes (short diameters) of from 0.3 to 20 μm, and the disperse phase having an area percentage of at least 15% or larger relative to the whole sectional area.

2. A frosted plastic container according to claim i, wherein the resin (A) that forms the continuous phase and the resin (B) that forms the disperse phase exist at a volume ratio of A:B of 90:10 to 55:45.

3. A frosted plastic container according to claim 1, wherein the resin (A) that forms the continuous phase has a melting point or a softening point that is higher than that of the resin (B) that forms the disperse phase.

4. A frosted plastic container according to claim 1, wherein the resin (A) that forms the continuous phase and the resin (B) that forms the disperse phase are olefin resins.

5. A frosted plastic container according to claim 1, wherein the resin (A) that forms the continuous phase is a propylene resin and the resin (B) that forms the disperse phase is an ethylene resin.

6. A frosted plastic container according to claim 5, wherein the propylene resin has a melt flow rate of from 1 to 10 g/10 min. and the ethylene resin has a melt flow rate of 1 to 3 g/10 min. or smaller.

7. A frosted plastic container according to claim 1, wherein said container has a haze ($H_1$) which is 65% or smaller as measured by applying a liquid paraffin to both surfaces of the container and has a haze (H) of 45% or greater as found from the following relation by using the above haze $H_1$ and a haze ($H_0$) that is measured by applying the liquid paraffin to the inner surface of the container, $$H=(H_0-H_1)/(1-H_1/100).$$

8. A frosted plastic container according to claim 1, wherein the disperse phase has an aspect ratio of 3 or smaller.

9. A frosted plastic container according to claim 1, wherein the disperse phase contains grains of resin (B) having grain sizes of from 0.5 to 10 μm.

10. A frosted plastic container according to claim 1, wherein the disperse phase has an area percentage of 20 to 60% relative to the whole sectional area.

11. A frosted plastic container according to claim 2, wherein the resin (A) that forms the continuous phase and the resin (B) that forms the disperse phase exist at a volume ratio of A:B of 85:15 to 60:40.

12. A frosted plastic container according to claim 5, wherein the propylene resin is a homopolymer of propylene, a random copolymer of propylene or a block copolymer of propylene.

13. A frosted plastic container according to claim 12, wherein the propylene resin is a random or a block copolymer of propylene with ethylene, butene-1 or 2-methylpentene-1.

14. A frosted plastic container according to claim 5, wherein the propylene resin contains 90% by weight or more of propylene.

15. A frosted plastic container according to claim 5, wherein the ethylene resin is a low-density polyethylene, a medium density polyethylene, a high density polyethylene, a linear low density polyethylene which is a copolymer of ethylene and an alpha-olefin, a medium-density polyethylene which is a copolymer of ethylene and an alpha-olefin, or a copolymer of ethylene and a vinyl or acrylic monomer.

16. A frosted plastic container according to claim 5, wherein the ethylene resin contains 80% by weight or more ethylene.

17. A frosted plastic container wherein at least the outer surface of the plastic container is formed of a blend of olefin resins comprising a continuous phase of a resin (A), and a disperse phase of a resin (B), the disperse phase having an aspect ratio (ratio of long diameter/short diameter) of 6 or smaller and containing grains of resin (B) having grain sizes (short diameters) of from 0.3 to 20 microns, and the disperse phase having an area percentage of at least 15% or larger relative to the whole sectional area, said resin (B) having a melt tension greater than that of the resin (A).

* * * * *